US008639740B2

(12) United States Patent
Belluati et al.

(10) Patent No.: US 8,639,740 B2
(45) Date of Patent: Jan. 28, 2014

(54) COMMUNICATION SERVER WITH A SERVICE LOGIC EXECUTION ENVIRONMENT

(75) Inventors: Maurizio Belluati, Turin (IT); Andrea Giancola, Turin (IT); Massimo Valla, Turin (IT)

(73) Assignee: Telecom Italia S.p.A., Milan (IT)

( * ) Notice: Subject to any disclaimer, the term of this patent is extended or adjusted under 35 U.S.C. 154(b) by 1277 days.

(21) Appl. No.: 12/224,446

(22) PCT Filed: Feb. 28, 2006

(86) PCT No.: PCT/EP2006/060343
§ 371 (c)(1),
(2), (4) Date: Feb. 11, 2009

(87) PCT Pub. No.: WO2007/098806
PCT Pub. Date: Sep. 7, 2007

(65) Prior Publication Data
US 2009/0217299 A1   Aug. 27, 2009

(51) Int. Cl.
*G06F 15/16*   (2006.01)
*G06F 9/44*   (2006.01)

(52) U.S. Cl.
USPC .......................................... 709/202; 719/318

(58) Field of Classification Search
USPC .......... 709/224–227, 201–203, 223; 719/318, 719/328–329
See application file for complete search history.

(56) References Cited

U.S. PATENT DOCUMENTS

| 6,690,782 B2 | 2/2004 | Creamer et al. |
| 6,876,733 B2 * | 4/2005 | Creamer et al. ......... 379/201.12 |
| 7,072,957 B2 * | 7/2006 | Creamer et al. ............. 709/223 |
| 7,218,927 B2 * | 5/2007 | Hsu et al. ................... 455/422.1 |
| 7,788,109 B2 * | 8/2010 | Jakobson et al. .............. 705/1.1 |
| 2002/0191772 A1 | 12/2002 | Creamer et al. |
| 2003/0126584 A1 | 7/2003 | Creamer et al. |
| 2004/0116781 A1 * | 6/2004 | Weaver .......................... 600/300 |
| 2006/0070082 A1 * | 3/2006 | Sridhar et al. ................. 719/318 |

OTHER PUBLICATIONS

Swee Boon Lim, David Ferry, JAIN SLEE 1.0 Specification, Final Release, Jan. 30, 2004, Sun Microsystems, Inc., pp. 1-284.*

* cited by examiner

*Primary Examiner* — Chirag R Patel
(74) *Attorney, Agent, or Firm* — Finnegan, Henderson, Farabow, Garrett & Dunner, L.L.P.

(57) ABSTRACT

A server of a communication network provides a service to a plurality of users. In the server, a service logic execution environment is stored. The service logic execution environment includes an event router and a service application, which service application includes at least a first component and a second component. The first component is provided with an event handler and the second component is provided with an action handler. The service logic execution environment further includes a flow descriptor which includes a relation between the event handler and the action handler. The event router is adapted to receive an event from the first component and to forward such an event to the second component according to the relation.

26 Claims, 7 Drawing Sheets

COMMUNICATION SERVER WITH A SERVICE LOGIC EXECUTION ENVIRONMENT

CROSS REFERENCE TO RELATED APPLICATION

This application is a national phase application based on PCT/EP2006/060343, filed Feb. 28, 2006, the content of which is incorporated herein by reference.

TECHNICAL FIELD

The present invention generally relates to the field of communication network services. More particularly, the present invention relates to a communication server provided with a service logic execution environment and a method for providing services in a communication network. Further, the invention relates to a communication network comprising a communication server for providing services in the communication network.

BACKGROUND ART

A communication network is a network for providing a plurality of users with a number of services. For instance, a communication network may be either a fixed telephone network or a mobile telephone network offering voice services (calls, conference calls, automatic answering service, or the like), or a data network offering data services (e-mail, e-commerce, or the like). A user is connected to the communication network through a terminal, allowing the user to access services.

In a communication network, a service is typically implemented on a client-server basis, wherein server role is played by network apparatuses which are termed "application servers", whilst client role is played by user terminals. For providing a given service, an application server typically executes a server side service application. On the other hand, for accessing a service, a terminal typically executes a client side service application, which is suitably deployed for interacting with the server side service application relating to that service.

In the following description and in the claims, the term "service application" will indifferently refer both to a server side service application and to a client side service application relating to a given service.

Different methods are known in the art for implementing a service application. For instance, it is known to provide application servers with a service logic execution environment (briefly, SLEE). Such a SLEE is typically stored at an application server, and it is adapted to execute service applications allowing to provide network users with a plurality of services.

More particularly, the specification JSLEE v1.1 EDR, Dec. 21, 2004, details a SLEE in the Java language, which is particularly suitable for executing event based service and to integrate different network resources. Such a SLEE is based on a component-based model, allowing to build each service application as a set of object-oriented components, which are termed "Service Building Blocks" (briefly, SBB components). According to the above JSLEE v1.1, an SBB component identifies the event types accepted by the SBB component and has event handler methods that contain application code that processes events of these event types. In addition, an SBB component may have an interface for synchronous method invocation. At runtime, the SLEE creates instances of these components to process events and deletes components that are no longer eligible for event processing.

A SLEE which is compliant with the above JSLEE v1.1 specification thus comprises a plurality of modules, such as:
- a component container for containing SBB components of different service applications;
- an event router, whose role will be explained in detail herein after; and
- at least a resource adaptor (one resource adaptor for each protocol supported by the communication network), for forwarding information coming from the network and addressed to the SLEE and vice versa.

A SLEE comprises further modules, which will not be described, since they are not relevant to the present description.

Each SBB component is adapted to receive and process a predefined set of events. An event may comprise either a status change or something occurring either externally or internally to the SLEE. For instance, an event may comprise the reception of a message from the network at the SLEE, based on a given protocol (for instance SIP, http, or others). Alternatively, an event may comprise the expiration of a timer comprised into the SLEE. Generally, events may be generated by the network and received by the SLEE through a suitable resource adaptor. Alternatively, events may be generated by the SBB components, as well as by other modules comprised into the SLEE.

According to the JSLEE v1.1, an event is associated to a number of event variables, such as:
- Address: it identifies the address associated to the event (for instance, a telephone number, a URL address, or the like). The type of address varies according to the event type (see below) and according to the resource adaptor which generated such an event (for instance, in case of transmission of a SMS message, the address associated to the event "reception of a SMS message" may be either the sender identifier or the receiver identifier);
- AddressProfile: it identifies a service profile associated to the event address identified by the event variable Address. For instance, in the above example of a SMS message transmission, in case the variable Address comprises the sender identifier, the AddressProfile may comprise additional information about the sender, such as terminal type, subscription type, or the like;
- ActivityContext: it identifies the activity context the event has been fired on. An activity context, according to the JSLEE v1.1, is basically a logic entity of the SLEE, which is adapted to make a number of attributes available, so that different SBB components can share them (i.e. they can both read them and modify them). An activity context substantially acts as an event addressing point, i.e. it is adapted to receive events and to forward them to SBB components attached to it. An SBB component may be attached to an activity context either by the SLEE, or by the SBB component itself. An event is associated to a single activity context. Such an event may be forwarded only to the SBB components attached to its associated activity context; and
- EventType: it identifies the event type. Typically each protocol dependent message is mapped to a specific event type. Events that cause the SLEE to start a new service execution are known as "initial events".

JSLEE also provides null activity contexts, which are associated to an active service instance. Trigger events are fired on null activity context. The null activity context allows communication between SBB attached to a same activity.

As the SLEE receives an event and the associated event variables, the event router processes the event variables, and it consequently forwards the received event to the SBB components adapted to receive such an event.

According to JSLEE v1.1, initial events can be declared only by a particular type of SBB components, which are termed "SBB root components". In particular, as it is known, routing initial events to a suitable SBB root component is performed by the event router by computing a so-called "convergence name".

The SBB root component has a different convergence name for each initial event it is adapted to receive. Therefore, it is possible to define filtering criteria of initial events received by the SLEE. For instance, based on the convergence name, it is possible to route to an SBB root component only initial events relating to a service provided to a given user associated to a given value of the variable Address. Similarly, it is possible to route to an SBB root component only initial events relating to a service associated to a given activity context.

As already mentioned, SBB root components are adapted to receive initial events. Therefore, they may be directly invoked by the SLEE when a new activity is created associated to the initial event. On the other hand, SBB non-root components are adapted to receive only non-initial events, and therefore they cannot be invoked by the SLEE when an initial event is received and a new activity is created.

According to JSLEE v 1.1, instances to different SBB components (either root or non-root) while executing a service application may be represented as a so-called "SBB entity tree". An SBB entity is defined as an instance to an SBB component. An SBB entity tree is a tree diagram representing relations between different SBB entities. In particular, the tree root is an instance to an SBB root component of the service, which is termed "SBB root entity". Each node of such an SBB entity tree represents a respective SBB entity. When a first SBB entity is adapted to generate a second SBB entity, such SBB entities are directly linked by a branch, so that the second SBB entity is downstream the first SBB entity. Different SBB entities may be instances to a same SBB component.

Therefore, according to JSLEE v 1.1, when developing a new service application, SBB root components must be selected and initial event filtering criteria must be provided by defining a rule for computing a convergence name for each SBB root component. Then, the other SBB components are selected, and relations between such components are defined, so that the service application may be represented as an SBB entity tree. Such relations between different SBB components are written in a so-called SBB deployment descriptor, which comprises the SBB's interfaces, classes, child relations, and ActivityContext attribute aliases.

Other types of service logic execution environment are known in the art. US 2002/0191772 discloses a SLEE which is based on the above mentioned specification JSLEE, and which is aimed to make JSLEEs more suitable for real time applications, to reduce complexity of JSLEEs and to allow communication between different service components. To this purpose, US 2002/0191772 discloses a SLEE including a class loader for loading service components in the SLEE, and an event routing bus for receiving events from the protocol layer and other service components. The SLEE can register each loaded service component to receive events directed to particular registered service components. Subsequently, the event routing bus can route received events to the particular registered service component executing in the SLEE. The event routing bus can be further configured to receive events from the application components which are external to the SLEE and the protocol layer.

U.S. Pat. No. 6,690,782 discloses a service logic execution environment, which is namely a JSLEE, which is aimed to make a JSLEE capable of communicating with the protocol stacks in the protocol layer, without requiring specific knowledge of the underlying protocol stack. To this purpose, U.S. Pat. No. 6,690,782 discloses an application execution environment including a SLEE, at least one client component wrapper providing an abstract interface for a specific client component and at least a connector corresponding to the at least one client component, wherein the connector is configured to communicate with a client component through an abstracted interface provided by the corresponding client wrapper.

OBJECT AND SUMMARY OF THE INVENTION

The Applicant has observed that, up to now, the solution proposed in the art by JSLEE v 1.1 and by the other prior art documents are not completely satisfactory.

First of all, according to JSLEE v 1.1, different SBB components composing a service application are strongly coupled the one to the others, each SBB component interacting both with SBB components invoking it, and with SBB components invoked by it during service application execution. As a consequence, modifying or replacing a given SBB component requires modifying also SBB components interacting with it.

Moreover, when an SBB component developed for a first service has to be reused for a second service, it is likely that such an SBB component has to be modified, since it will have to interact with different SBB components, and therefore modifications of such an SBB component are required.

Such modifications are heavy when the complexity of the functions performed by the SBB component increases.

Moreover, since, as already described above, according to JSLEE v1.1, only SBB root components define the initial events for a service. In fact, even if other non-root SBB (child SBB) of a service declare initial events, these events are not considered by the SLEE as initial events for the service and therefore non-root SBB can not receive such events directly by the SLEE using initial event filtering criteria. The SBB developer typically will therefore develop new specific root SBBs for each new service declaring in the root SBB all initial events for the service. As a consequence, reusing of SBB root components undergoes limitations.

The Applicant has tackled the problem of how to provide a service logic execution environment and a method wherein modularity, possibility of reusing already developed SBB components and interchangeability of different SBB components are enhanced.

Therefore, the general aim of the present invention is providing a server with a service logic execution environment and a method for providing services in a communication network, which overcome some or all of the aforesaid problems.

An object of the present invention is providing a server with a service logic execution environment and a method for providing services in a communication network, wherein the possibility of reusing SBB components is enhanced, so that an SBB component, once developed for performing a given function in a given service, can be reused for performing the same function in successive services, substantially without requiring any modification of the code of the SBB component.

Further, an object of the present invention is providing a server with a service logic execution environment and a method for providing services in a communication network, which allow to provide SBB components that can be indifferently used either as SBB root components or as SBB non-root components.

According to a first aspect, the present invention provides a server of a communication network for providing a service to a plurality of users. In the server a service logic execution environment (SLEE) is stored. Said SLEE comprises an event router and a service application, which service application comprises at least a first component and a second component. The first component is provided with an event handler and the second component is provided with an action handler. According to the invention, the service logic execution environment further comprises a flow descriptor which comprises a relation between the event handler and the action handler. The event router of the present invention is adapted to receive an event from the first component and to forward such an event to the second component according to said relation.

According to a second aspect, the present invention provides a method for providing a service to a plurality of users in a communication network. The method is performed in a service logic execution environment (SLEE) which comprises an event router and a service application, which service application comprises at least a first component and a second component. According to the invention, the method comprises: providing the first component with an event handler and the second component with an action handler, providing the SLEE with a service flow descriptor which comprises a relation between the event handler and the action handler, receiving an event from the first component, and forwarding this event to the second component, according to said relation.

According to a third aspect, the present invention provides a computer program comprising computer program code means adapted to perform all the steps of the method as set forth above, when the program is run on a computer.

According to a fourth aspect, the present invention provides a computer readable medium having a computer program recorded thereon. The computer readable medium comprises computer program code means adapted to perform all the steps of the method as set forth above, when the program is run on a computer.

According to a fifth aspect, the present invention provides a communication network which comprises a server as set forth above, for providing a service to a plurality of users.

According to a sixth aspect, the present invention provides a service logic execution environment (SLEE) which comprises an event router and a service application, which service application comprises at least a first component and a second component. The first component is provided with an event handler, and the second component is provided with an action handler. The SLEE further comprises a service flow descriptor which comprises a relation between the event handler and the action handler. According to the invention, the event router is adapted to receive an event from the first component and to forward this event to the second component, according to said relation.

BRIEF DESCRIPTION OF THE DRAWINGS

The invention will become more clear by reading the following detailed description, given by way of example and not of limitation, to be read with the accompanying drawings, wherein.

DETAILED DESCRIPTION OF PREFERRED EMBODIMENTS OF THE INVENTION

Figure 1:
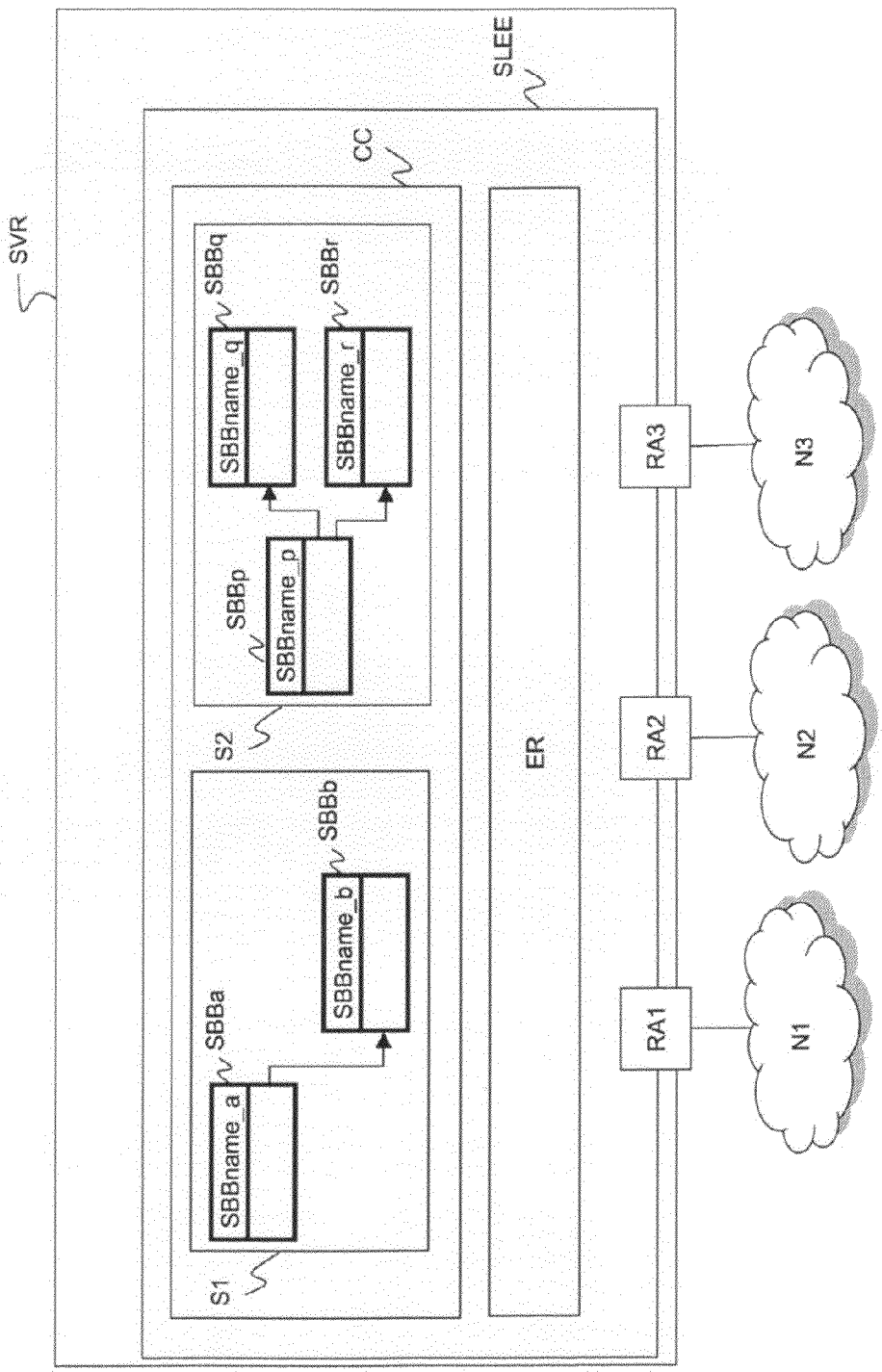
FIG. 1 schematically shows a block diagram of a SLEE.

FIG. 1 schematically shows a block diagram of a SLEE. Such a SLEE may be installed for instance on an application server SVR, and it interfaces with a number of networks N1, N2, N3, as it will be explained in further details hereinafter.

For instance, the communication networks N1, N2, N3 may comprise a public switched telephone network (PSTN), or a public land mobile network (PLMN), or a packet-switched telephone network (VoIP), or a data network (Internet, etc. supporting services such as web services and e-mail). Each network may support one or more protocol. For simplicity, it is assumed that each network N1, N2, N3 supports a single service layer protocol. The communication networks N1, N2, N3 are also connected to a respective number of users, which are not shown in FIG. 1.

The SLEE of FIG. 1, as already mentioned above, comprises several modules. In particular, FIG. 1 shows an event router ER, a component container CC and resource adaptors RA1, RA2, RA3. The SLEE comprises further modules, which are not shown as they are not relevant to the present description.

The component container CC is adapted to store the various service applications associated to the services the application server SVR is adapted to provide, each service application comprising a respective set of SBB components. By way of example, it is assumed that the component container CC stores only two service applications S1, S2. The first service S1 comprises two SBB components SSBa, SBBb, while the second service application S2 comprises three SBB components SBBp, SBBq, SBBr. Each SBB component SSBa, SBBb, SBBp, SBBq, SBBr is associated to a respective SBB component name SBBname_a, SBBname_b, SBBname_p, SBBname_q, SBBname_r, as shown in FIG. 1.

The resource adaptors RA1, RA2, RA3 are adapted to interface the SLEE with the communication networks N1, N2, N3. Each resource adaptor is based on a respective protocol (for instance, SIP, INAP, CAP, SMPP, MM7 or the like). In FIG. 1, three resource adaptors are shown, by way of non limiting example.

The event router ER is adapted to receive events from the resource adaptors RA1, RA2, RA3, from the SBB components SBBa, SBBb, SBBp, SBBq, SBBr and from other modules (not shown) comprised into the SLEE, and to forward said events to suitable SBB components SBBa, SBBb, SBBp, SBBq, SBBr, according to the above cited event variables.

As already mentioned, the event router is capable of filtering initial events in order to forward each initial event to a suitable SBB root entity, by computing the convergence name of the SBB root entity as a function of the event variables which are associated to the received initial event. On the other hand, for other event types, the event router forwards the event to SBB components which are adapted to receive such an event.

The present invention provides a service logic execution environment wherein the SBB components are advantageously adapted to receive initial events, i.e. wherein for each SBB components initial event filtering criteria can be defined.

Figure 2:
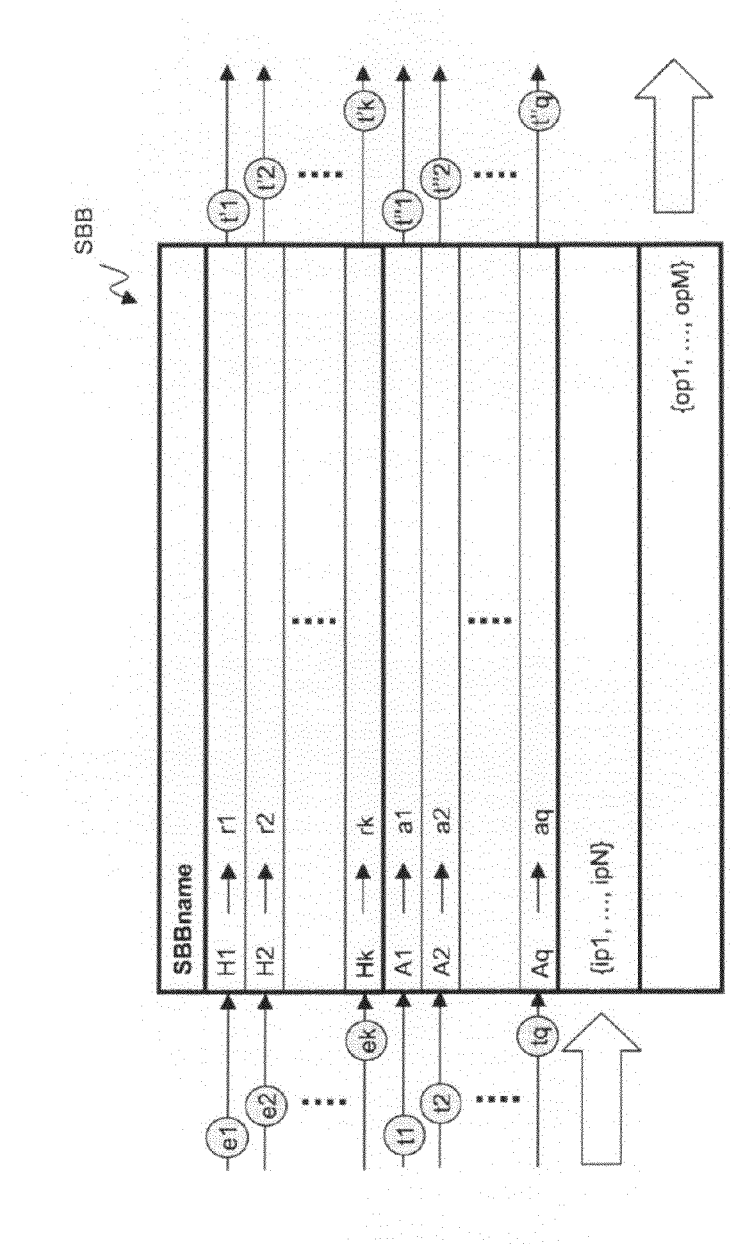
FIG. 2 schematically shows an SBB component according to an embodiment of the present invention.

To this purpose, according to the present invention, each SBB component is provided with a standard interface. FIG. 2 schematically shows an SBB component according to an embodiment of the present invention.

In particular, as shown in FIG. 2, according to the present invention, providing each SBB component with a standard interface comprises defining the following features.

First of all, for each SBB component, a set of event handlers H1, H2, . . . , Hk is defined. Each event handler H1, H2, . . . , Hk is adapted to receive a respective event e1, e2, . . . , ek and to take a respective consequent action r1, r2, . . . , rk, which substantially consists in a sequence of instructions for processing the event e1, e2, . . . ek. Also, each event handler is adapted to send a respective trigger event t'1, t'2, . . . , t'k.

Moreover, for each SBB component, a set of action handlers A1, A2, . . . , Aq is defined. Each action handler A1, A2, . . . , Aq is adapted to receive a respective trigger event t1, t2, . . . , tq and to take a respective consequent action a1, a2, . . . , aq, which substantially consists in a sequence of instructions that an SBB component is able to perform autonomously (e.g. forwarding a request, rejecting a request, or the like). Also, each action handler is adapted to send a respective trigger event t"1, t"2, . . . , t"q. Preferably, according to the present invention, action handlers of an SBB component are coherent with event handlers of other SBB components. This means that, for instance, in case of a call, events handlers allow to monitor the state of a call, while action handlers allow to properly handle the call according to its state.

Event handlers differ from action handlers in that the formers receive events generated from the resource adaptors and facilities of the SLEE, while the latters receive trigger events from other SBBs.

Moreover, for each SBB component a set of input parameters {ip1, . . . , ipN} is defined, which substantially allows to configure the SBB component.

Then, for each SBB component a set of output parameters {op1, . . . , opM} is defined, which are computed by the SBB component during its execution. Advantageously, output parameters {op1, . . . , opM} of a given SBB component may be used for computing the input parameters {ip1, . . . , ipN} of other SBB components belonging to the same service application, as it will be shown herein after.

It can be noticed that, as event handlers and action handlers of different SBB components are preferably coherent, according to the present invention, a service application may advantageously be developed by simply defining relations between event handlers and action handlers of different SBB components.

Therefore, for developing a new service, according to the present invention, a service developer must select suitable SBB components, define relations between event handlers and action handlers of the selected SBB components (or, in other words, build the SBB entity tree of the service), and define relations between input parameters and output parameters of the selected SBB components.

According to preferred embodiments of the present invention, relations between event handlers and action handlers and between input parameters and output parameters may be written in a single file, which will be termed "service flow descriptor". According to particularly preferred embodiments of the invention, the service flow descriptor is implemented as an XML file. This is a non limiting example, and other languages could be employed as well.

The operation of the service flow descriptor while executing a service application according to the present invention will be described herein after.

Figure 3A:
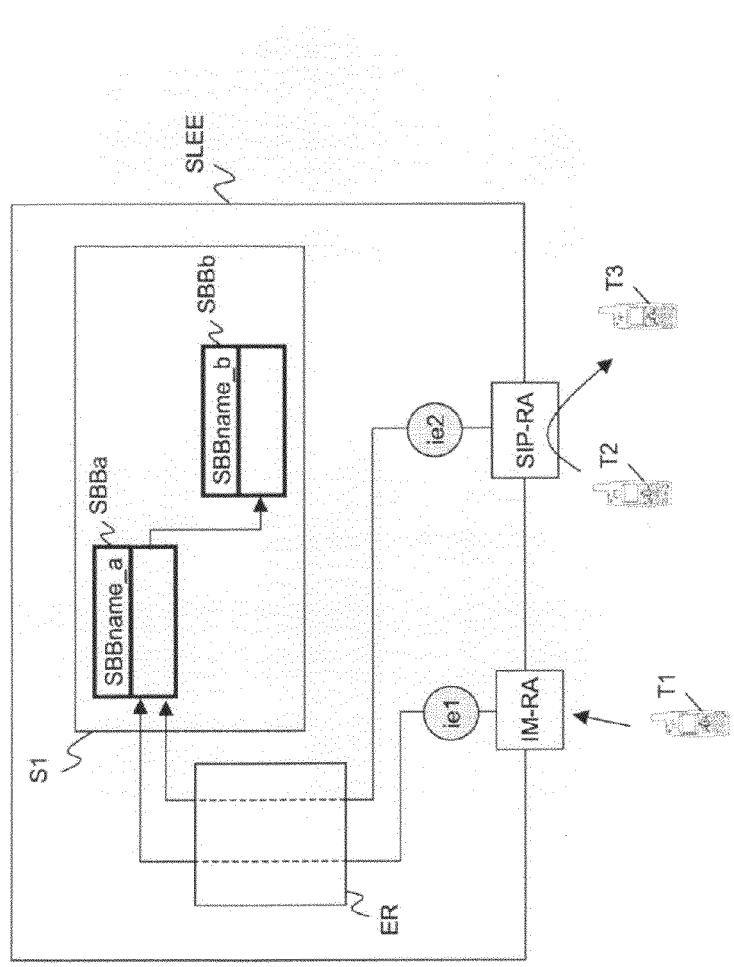
FIGS. 3a and 3b show SBB an exemplary service implemented according to the prior art and according to an embodiment of the present invention, respectively.
Figure 3B:
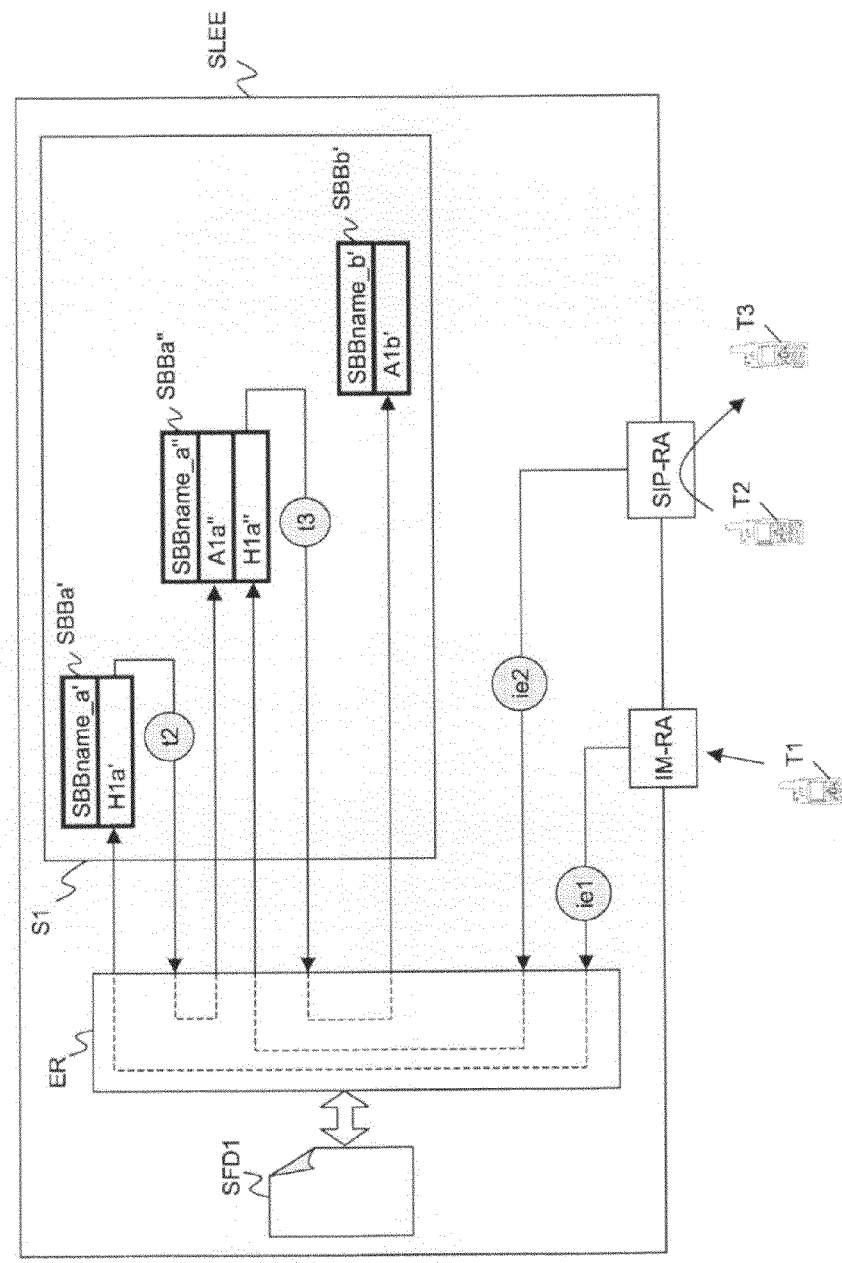

FIGS. 3a and 3b show a SLEE executing a service application S1 for providing an exemplary service, according to the prior art and according to an embodiment of the present invention, respectively. Such an exemplary service allows a first user, which is connected to a communication network by means of a first terminal T1, to be informed whenever a second user, which is connected to the communication network by means of a second terminal T2, calls a third user, which is connected to the communication network by means of a third terminal T3, or vice versa.

FIGS. 3a and 3b only show SLEE modules which are required for understanding the example. Therefore, the component container CC is omitted.

It is assumed that the first user may activate such an exemplary service by sending an activation Instant Message to an application server managing such a service. Further, it is assumed that the first user is informed about possible calls between the second and the third user by means of a notification Instant Message. Further, it is assumed that calls between the second and the third user are SIP calls. It is assumed that each user is identified by a respective identifier, which could be for instance its URL address.

Such an exemplary service substantially comprises three steps. During a first step, the first user sends to the application server an activation Instant Message comprising for instance its own identifier, the identifier of the service he wishes to activate, and service configuration information (such as, for instance, the identifiers of the second and the third users).

During a second step, the application server listens for possible SIP calls between the second and the third user. For instance, when the second user calls the third user, the application server receives from the communication network a SIP message signaling the set up of a SIP call between T2 and T3.

During a third step, upon reception of the SIP signaling message, the application server sends to the first user a notification Instant Message, informing the first user that the second user is calling the third user.

Therefore, in the above exemplary service, two initial events are described:
- a first initial event ie1, corresponding to the reception at the application server of an activation Instant Message sent by the first user; and
- a second initial event ie2, corresponding to the reception at the application server of a SIP signaling message from the network N.

FIG. 3a shows the SLEE executing the service application S1 for providing such exemplary service, according to JSLEE v1.1.

According to JSLEE v1.1, the SBB root component of the service application S1 has to be able to receive all the initial events associated to the service. In particular, such an SBB root component must be able to receive both activation Instant Messages (ie1) and SIP signaling messages (ie2). Therefore, the developer of service application S1 has to create a dedicated SBB root component, which is capable of receiving both activation Instant Messages (ie1) and SIP signaling messages (ie2). Such an SBB dedicated root component should be capable, upon reception of a SIP signaling message (ie2), of activating an SBB non-root component, which should be adapted to send an Instant Message with a predefined content.

Therefore, as shown in FIG. 3a, the service application S1 comprises an SBB root component SBBa (whose name is SBBname_a) which is adapted to receive the first initial event ie1 from a first resource adaptor IM-RA and the second initial event ie2 from a second resource adaptor SIP-RA. The SBB root component SBBa is adapted to directly activate, upon reception of the initial event ie2, an SBB component SBBb (whose name is SBBname_b), which is capable of sending an Instant Message with a certain content.

When the first user sends an activation Instant Message, such a message is received through the event router ER and processed by the SBB root component SBBa. SBBa then listens for possible SIP signaling messages and, when it receives through the event router ER a SIP signaling message relating to a SIP call between T2 and T3, it directly activates the SBB component SBBb. The SBB component SBBb then sends a notification Instant Message to the first user (not shown in FIG. 3a).

FIG. 3b shows the SLEE executing the service application S1 for providing such exemplary service, according to an embodiment of the present invention.

According to the present invention, the service S1 comprises a first SBB component SBBa' (whose name is SBBname_a'), a second SBB component SBBa" (whose name is SBBname_a") and a third SBB component SBBb' (whose name is SBBname_b'). Each SBB component has a structure similar to the one shown in FIG. 2. This means that each SBB component may comprise event handlers for receiving initial events or non initial events, and for each SBB component provided with at least an event handler for receiving an initial event, according to the present invention, a convergence name can be computed, as it will be shown in greater detail herein after.

In particular, the first SBB component SBBa' is provided with an event handler H1a', which can be termed "onInstantMessage", for receiving an initial event ie1 (reception of an Instant Message). Besides, the second SBB component SBBa" is provided with an event handler H1a", which can be called "on NewSIPCall", for receiving an initial event ie2 (reception of a SIP signaling message). Such a second SBB component SBBa" is further provided with an action handler A1a", which can be termed "MonitorCall", to start listening for possible SIP signaling messages. Further, the third SBB component SBBb is provided with no event handlers, but only with an action handler A1b', for sending Instant Messages.

For each SBB component of FIG. 3b, input parameters and output parameters are also defined. For instance, possible input parameters for the first SBB component SBBa' can be the Instant Message source identifier ("from") and the Instant Message destination identifier ("to"), while a possible output parameters can be the Instant Message body. Similarly, possible input parameters for the second SBB component SBBa" can be the call source identifier ("from") or the call destination identifier ("to"). On the other hand, possible output parameters for the second SBB component SBBa" can be the call duration, the call status ("ended", "ongoing", or the like), the actual call source identifier ("from") or the actual call destination identifier ("to").

Therefore, it can be noticed that, according to the present invention, the service S1 may be implemented by three SBB components (instead of two, see FIG. 3a). Indeed, the functions performed by the SBB dedicated root component SBBa (prior art, FIG. 3a) are split into two different SBB components SBBa' and SBBa", which are individually simpler than the SBBa. SBBb' substantially performs the same function of SBBb, but it is provided with a standard interface (in particular, with an action handler A1b'), as shown in FIG. 2.

Thus, advantageously, according to the present invention, the developer of the service application does not have to create any dedicated SBB root component. In fact, the developer simply has to create a service flow descriptor SFD1, comprising the relations between event handler and action handlers and the relations between input parameters and output parameters of the SBB component SBBa', SBBa" and SBBb'.

Therefore, according to the present invention, when the first user sends an activation Instant Message to the application server, the resource adaptor IM-RA generates an initial event ie1, which is received by the event router ER. The event router ER, according to the relations described by the service flow descriptor SFD1, determines to forward it to the event handler H1a' of SBBa'. The event handler H1a' of the SBB component SBBa', upon reception of ie1, performs its reaction, thus generating a trigger event t2. Such a trigger event t2 is forwarded to the event router ER which, according to the relations described by service flow descriptor SFD1, determines to forward it to the SBB component SBBa". Then, the SBBa", upon reception of the trigger event t2, activates its action handler A1a", thus starting to listen for possible SIP signaling messages.

Upon reception of a SIP signaling message relating to a SIP call between T2 and T3, the resource adaptor SIP-RA generates an initial event ie2, which is received by the event router ER. The event router ER, according to the relations described by the service flow descriptor SFD1, determines to forward it to the event handler H1a" of the SBB entity SBBa". The event handler H1a" of the SBB component SBBa", upon reception of ie2, performs its reaction, thus generating a trigger event t3. Such a trigger event t3 is forwarded to the event router ER which, according to the relations described by the service flow descriptor SFD1, determines to forward it to the SBB component SBBb'. Then, the SBBb', upon reception of the trigger event t3, activates its action handler A1b', thus sending a notification Instant Message to the first user (not shown in FIG. 3b).

By comparing FIGS. 3a and 3b, it becomes clear that a service flow descriptor SFD1 according to the present invention is different from the known Service and SBB deployment descriptors according to JSLEE v1.1. In fact, the known Service and SBB deployment descriptors only identify the SBB root component of a service application, and the initial events such an SBB root component is adapted to receive. Once received an initial event, the SBB root component processes such an initial event and forwards it to possible SBB non-root component which are interested in receiving such an event. In other words, an SBB root component has information about the child relations between the different SBB components of the service application, or, in other words, the SBB root component exactly knows the structure of the entity tree of the service, and it uses such information to forward events to the other SBB non-root components.

On the contrary, the service flow descriptor according to the present invention describes relations between all the SBB components of the service application, and in particular between event handlers and action handlers and between input parameters and output parameters of the SBB components. Single SBB components do not have any information about their position within the entity tree, or, in other words, each SBB component is completely decoupled from any other SBB component belonging to the same service application. Each SBB component simply interacts with the event router, which is capable of managing events by exploiting the service flow descriptor, which comprises all the information for properly instantiating the SBB components for the service and routing the events to them.

Therefore, defining a standard interface for each SBB component as described above and defining a service flow descriptor for each service application as described above has many advantages.

First of all, by defining a standard interface comprising event handlers for each SBB component, each SBB component may receive initial events "directly" (i.e., through the event router) from the resource adaptors. In other words, each SBB component may be directly activated by the SLEE, without the need of waiting that another SBB components activates it. This advantageously allows to avoid developing dedicated SBB components, which are adapted to handle more than one type of initial event for activating other SBB components, and which can be hardly reusable in other services.

On the contrary, SBB components according to the present invention may be very simple (i.e. each of them may be able to perform a very simple operation), without the need of combining them in more complex SBB components. This advantageously increases modularity of service applications and flexibility in reusing already existent SBB components.

Further, implementing a service flow descriptor comprising all the relations between event handlers and action handlers and between input parameters and output parameters advantageously allows to substantially decouple SBB components of a service, so that when reusing an SBB component in a further service application, substantially no modification is required, except modification in its configuration parameters. Such modification is implemented in the service flow descriptor, without requiring any change to the SBB component itself.

Further, advantageously, according to the present invention, each SBB component may be used either as an SBB root component or as an SBB non-root component, by simply changing its declaration in the service flow descriptor.

Therefore, according to the present invention, when a user requests the activation of a service, the SLEE executes the service flow descriptor corresponding to the requested service, thus creating the SBB entity tree of the service according to relations between different SBB components. On the other hand, upon reception of an initial event (for instance, a new telephone call), an activity context is created, and the SBB components which are interested to such an initial event are attached to such an activity context, based on the computation of the convergence name.

According to a first embodiment, the present invention provides for adjusting a service instance so that conditions regulating the creation of service instances can be identified. This advantageously would allow to create service instances only when necessary, by computing the convergence name.

According to other embodiments, the present invention provides for implementing initial event filtering criteria for initial events which are adapted to be received by the SBB entities of the executing service application, which are interested in receiving the initial event. In this case, thus, modality through which SBB entity are interested by the reception of a new event is involved. When a service application comprises a plurality of service instances, indeed, it is preferred to identify SBB identities which are interested in receiving a given event in an indexed manner, so that service execution is as fast as possible.

In particular, according to the present invention, filtering criteria are defined according to a convergence name, which, as already mentioned, is computed for each SBB entity which is adapted to receive an initial event.

In particular, as already mentioned, it is known to compute the convergence name for an SBB root entity according to the associated event variables Address, AddressProfile, ActivityContext and EventType of the received initial event. For instance, the variable Address identifies the user or the resource the event is associated to, and it may for instance comprise the telephone number of the user, an URL of a web site, or the like. Typically, an address is associated to a plurality of activities. Defining a variable Address corresponds to associating the instance of the SBB to all the activities with a same address. On the other hand, the variable AddressProfile identifies the service profile associated to the event address. A service profile is a set of data required for implementing a given service, such as, for instance, the user voice mailbox number, the service activation status, or the like. In some cases, the existence of a service profile for a given user and for a given service may indicate that such a user has subscribed such a service. Defining an AddressProfile event variable corresponds to subjecting an SBB instance to the presence of an event profile. On the other hand, the event variable ActivityContext identifies the activity the event relates to. An event variable ActivityContext may comprise, for instance, a call identifier, an Instant Message identifier, a web session identifier or the like. Defining an ActivityContext variable corresponds to associating an SBB instance to a single activity, i.e. the event activity. On the other hand, the event variable EventType identifies the type of event. An event variable EventType is typically associated to a plurality of activities and addresses. Defining a variable EventType corresponds to associating the SBB to all the activities wherein an event of the type identified by the variable EventType occurs.

According to the present invention, such known event variables, which comprise a number of fields, are added with at least an additional field. Preferably, in such known event variables, one or more of the following fields are inserted:

field value; such a field, according to the present invention, may be optionally used in event variables Address. It identifies a value which is different from the event address and which is adapted to be used when computing the convergence name of the SBB component, as it will be shown in greater detail herein after. The field value may comprise either a string or an output parameter computed and output by another SBB component; and field key; such a field is inserted in event variables AddressProfile and it identifies an output parameter computed and output by a profile SBB, such an output parameter being adapted to be used as a search key for finding the profile associated to the event address. The use of such additional field advantageously allows, in case a user requests the activation of a given service, to perform a preliminary check to establish whether the user may access such a service, thus avoiding to needlessly allocate resources for activating such a service. Two examples are described herein after.

According to a first example, for instance, it is assumed that a user wishes to activate a given service. It is assumed that such a service can be provided only if the user has a given profile (for instance, he is classified as a "premium user"). If the service activation is performed, for instance, through a call, such a call will generate an initial event, the event router will read the value of the event variable AddressProfile. According to the present invention, the event variable AddressProfile preferably comprises at least the field value, which preferably comprises a valid reference to an instance to a profile type SBB which is defined by the service flow descriptor itself. Preferably, the variable AddressProfile also comprises the field key, which preferably identifies the attribute upon which the profile search has to be performed, by using the event address as a value. If there exists a profile whose key field value is the event address, the search condition is fulfilled; for instance, the field key may comprise the telephone number profile attribute of the user.

Therefore, in this case, the initial-event-select may be: <initial-event-select variable="AddressProfile" key="MyProfileSBB.profileKey"/>, wherein "profileKey" is a key-type attribute associated to the profile SBB identified by the name "MyProfileSBB" in the service flow descriptor.

Therefore, upon reception of an event associated to a given event variable AddressProfile, a new service instance is generated only if there exists a profile associated to the user. The search key is the variable of the profile defined into the field key, and the searching value is the address of the received event.

According to a second example, it is assumed that a user wishes to activate a given service. It is assumed that such a service can be provided only for a given address, which is different from the address value comprised into the event variable Address. For instance, the event variable Address comprises the user address, whilst the service may be activated only if the dialed number is a particular number, for instance of a call center, or the like. According to the present invention, the event variable Address may comprise the field value. In this case, the field value comprises an address which is different from the address specified by the event variable Address associated to the received event and which is used only while creating a new SBB component for the initial computation of the convergence name. Therefore, the field value is comprised into the variable Address only in case of SBB non root entities. In this case, while creating the new SBB component, the convergence name will be computed according to the value comprised into the field value, instead of using the value of the event variable Address associated to the received event. In this case, the initial-event-select may be: <initial-event-select variable="Address" value="011228111"/>.

011228111 is the above mentioned address (i.e. the particular number, for instance of a call center, or the like). The field value may comprise a constant value (as in the above example), a variable value which is computed and output by another SBB component, including possible profile SBB components. Therefore, it is possible to merge and thus simplify the mechanism, since the profile SBB components are provided with the standard interface according to the present invention.

In this case, the initial-event-select may be: <initial-event-select variable="Address" value="MySBB.${myVar}"/>, wherein "MySBB" can be a SBB Profile instance defined in the service descriptor). It has to be noticed that ${ . . . } is the syntax for referring to the value of an output parameter of an SBB component.

In case of the 'MySBB' is a Profile SBB, this advantageously allows to define, for SBB non-root entities, initial event filtering criteria for events coming from different network apparatuses having different addresses.

For instance, an SBB component for receiving Instant Messages which is employed in a service application wherein the SBB root component may receive requests based on a different protocol (for instance http), may be interested in receiving events coming from addresses different from the address associated to the service activation http request. Indeed, a user accessing such a service could send Instant Messages from a SIP user agent which is identified by a SIPurl which is different from the address associated to the service activation http request. Such addresses may be different, but identified the same user that required the service. Therefore, preferably, it is a profile parameter which is used to instance the service itself.

Figure 4:
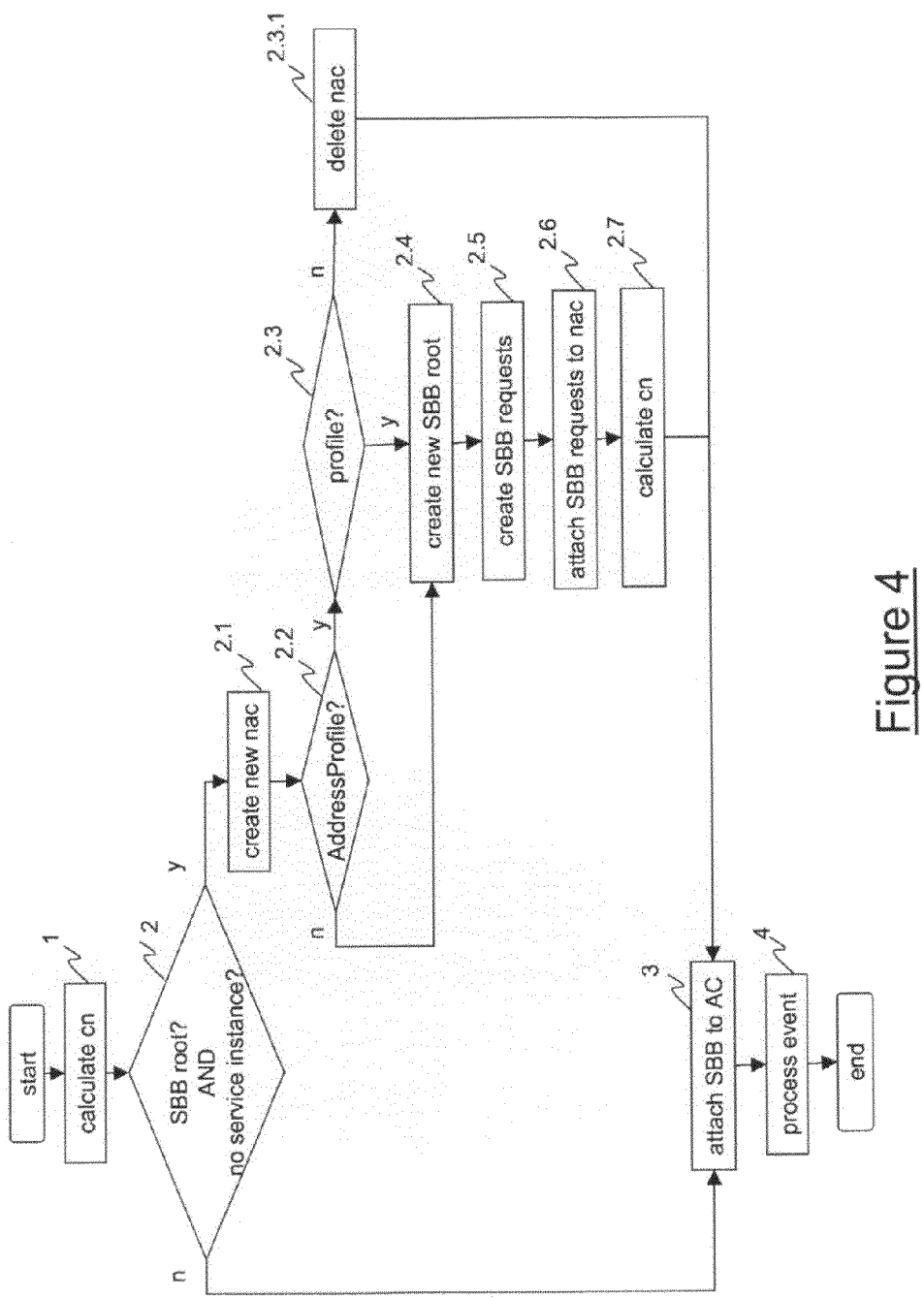
FIG. 4 shows a flow chart of a preferred embodiment of an algorithm for pre-processing an event according to the present invention.

Herein after, by referring to the flow chart of FIG. 4, it will be described an algorithm which is preferably used for pre-processing an event, i.e. for creating service instances, for computing the convergence name associated to different SBB components (both root and non-root) and for activating the attach of the SBB entities on a service activity context.

Upon reception of a new event e:

step 1: for each deployed service and for each SBB component (both root and non-root) which is adapted to receive the event e, the SLEE computes the convergence name cn as a function of information comprised into the service flow descriptors and of the event variables associated to the received event e, according to a first computation mode which will be described in further detail herein after;

step 2: if the SBB is an SBB root component, and there is not yet a service instance of the SBB root component having a convergence name consistent with the event convergence name or, in other words, the values of the event variables Address, ActivityContext and EventType are equal to the ones of the SBB root component convergence name (it has to be noticed that if an SBB has only a variable Address, the compliance is checked only with the event address):

step 2.1: the SLEE creates a new null activity context nac associated to the service instance;

step 2.2: the SLEE checks whether among the variables there is a variable AddressProfile. If no, it executes a step 2.4;

step 2.3: if yes, the SLEE checks the existence of the profile instance defined, and it implicitly acquires, by using as search key, the event address, based upon the specified by the field key.

step 2.3.1: if there is no profile instance, the SLEE clears the null activity context nac and goes to the step 3; otherwise step 2.4: the SLEE creates a new SBB root entity and it associates it to the service and to the computed convergence name cn:

step 2.5: the SLEE creates different instances of SBB associated to the service;

step 2.6: the SLEE performs the attach of the created SBB instances (root and non-root) to the new null activity context nac;

step 2.7: the SLEE computes the convergence name cn and it associates it to all the newly created SBB according to a second computation mode, which will be described in further detail herein after;

step 3: for each SBB instance associated to a convergence name cn computed during step 1, which corresponds to the event e, the SLEE performs the attach of such SBB instance to the activity context associated to the event e;

step 4: the SLEE forwards the event e to the SBB entities attached to the activity context associated to the event 9, according to priority values associated to the SBB entities.

It can be noticed that, according to preferred embodiments of the present invention, an SBB entity, while processing an event or after having processed an event, may tag such an event as "consumed", for signaling to successive SBBs that the event has already been handled, and therefore successive SBBs may only perform read-only actions on such an event, but they are not allowed to further handle it. This advantageously allows to inform the other SBB entities that the event has already been processed, thus preventing them from performing illegal operation towards the resource adaptors.

In the following, a first and a second computation mode of the convergence name according to embodiments of the present invention will be described.

In a first computation mode, computation of the convergence name is substantially performed upon reception of an event. Therefore, it is advantageously possible to verify the presence of SBB entities which are interested in receiving the event, and to create new SBB entities, in case there is no SBB entity which is already active.

More particularly, it is assumed that the received event e is associated to a given activity context ac and to a given address a. Further, it is assumed that the received event is related to a service, which is associated to a respective event descriptor, describing, among the others, a particular SBB component, as a function of what has been declared into the event variables of the initial event defined according to the event type. In this case, the convergence name is preferably computed by properly combining the values of the event variables, according to the following rules:

Address and AddressProfile: a string univocally identifying the address a;
ActivityContext: a string univocally identifying (activity handle) the activity context ac; and
EventType: a string univocally identifying the type of the received event e.

As computation is performed upon reception of an event, possible values comprised into the field value, which is defined into the service flow descriptor, are not relevant for computing the convergence name cn. It has to be noticed that herein reference is made to declaring output parameters which are defined for the SBB root component. According to embodiments of the present invention, when computing a convergence name for an SBB root component, the field value of the event variable Address is not used. According to other embodiments of the present invention, the field value of the event variable Address may be used also for computing the convergence name of SBB root components.

Preferably, according to the present invention, the convergence name cn may be obtained by concatenating the values of the event variables associated to the received event e, and by separating each single value by means of a special character (for instance, ";").

In the following, some examples are shown of computing the convergence name cn according the said first computation mode. For all the examples, it is assumed that the values of the event variables associated to the received event are:
Eventype.id: EVENT_TYPE_BUSY;
Address.stringName: sip:11111@telecomitalia.it; and
ActivityContext. handle: 246a5098-c0a80113-13c4-8ead-22d610b-3736.

According to a first example, the convergence name cn is computed as a function of the event variables Address and ActivityContext associated to the root SBB. In this case, such event variables Address and ActivityContext are defined in the service flow descriptor for a given SBB component and for a given initial event type. Therefore, this first example may be applied only for computing the convergence name of a given SBB root component.

Therefore, the value of the convergence name will be: cn: sip: 11111@telecomitalia.it;246a5098-c0a80113-13c4-8ead-22d610b-3736

According to a further example, the convergence name cn is computed as a function of the event variable Address; therefore, its value will be: cn: sip:11111@telecomitalia.it. The same remarks of the first example also apply to this second example.

According to a further example, the convergence name cn is computed as, a function of the event variable Address, under the assumption that the field value defined by the service flow descriptor comprises a value different from the event variable Address; therefore, its value will be: cn: sip: 11111@telecomitalia.it. In this latter example, the field value defined by the service flow descriptor has not been taken into account for computing the convergence name cn, as already mentioned above. The same remarks of the first example also apply to this second example.

In a second computation mode, according to the present invention, computation of the convergence name is substantially performed upon creation of a new SBB component. In this case the convergence name is associated to an SBB component. In this case, convergence names cn adapted to be associated to different SBB components (including the SBB root component) are preferably computed and defined.

Computation of the convergence name preferably comprises, for new service requests, the following steps:
identifying the service SBB root component, and computing its convergence name cn upon reception of an event, according to the above described first computation mode. It can be noticed that the convergence name cn of the SBB component is filtered based on the output parameters defined into the service flow descriptor, as in the above examples;
associating an instance to the SBB root component to the computed convergence name cn;
for each SBB non-root component of the service application and for each initial event:
computing the respective convergence name according to the above described first computation mode, as a function of the event variables associated to the received event, with the following exceptions:
for variables Address only comprising a field value, in turn comprising a constant value, the convergence name is computed as a function of such a constant value;
for variables Address comprising a variable of another SBB component, the convergence name is computed only when such a variable is stored into the null activity context associated to the service instance. Each time such a variable changes its value, the convergence name value has to be updated consequently;
if there is no initial event associated to the SBB component, the SBB component is associated to the convergence name already computed for the SBB root component;
associating the computed convergence name(s) to the SBB component; and
in case of incongruence the involved SBB component are not attached to the activity context, and a notification is required for informing the developer about the incongruence. Such a notification may be for instance a warning message displayed at the developer terminal.

Preferably, different SBB entities of a service application are ordered based on their convergence name. This advantageously allows to identify in a very fast manner SBB entities adapted to receive a given event.

According to the present invention, an SBB component is activated upon one of the following conditions:
- an initial event which is mapped on one of the SBB component handlers has been received; or
- an event activating an action handler defined for the SBB component into the service flow descriptor relating to the service has been generated; or
- the SBB component has been explicitly attached to an activity context.

On the other hand, according to the present invention, an SBB component is deactivated upon one of the following conditions:
- if the SBB component has been previously activated upon reception of an initial event, and the event variables associated to this event comprise an ActivityContext variable, or if the SBB component has been explicitly attached to an activity context, the SBB component is deactivated when:
  - a final event (which is generated and tagged as final event by the resource adaptor or by other modules comprised into the SLEE which generated the final event) is forwarded to the activity context to which the SBB component is attached; and
  - an explicit deactivation process is executed upon the activity context to which the SBB component is attached.

It can be noticed that if the SBB component has been previously activated upon reception of an initial event, and the event variables associated to this event do not comprise any ActivityContext variable, the SBB component remains active even after final events have been removed from the activity context.
- if the SBB component has been activated upon reception of a trigger event triggering an action, the SBB component is active while executing the action, and it is automatically deactivated when the action is completed, if such an SBB component is not attached to any activity context. If the action comprises an attach of the SBB component itself to an activity context, the SBB component is active either until a final event is received by the activity context, or until the activity context is explicitly deactivated.
- when an event EndActivity is explicitly forwarded to the null activity context it is attached to;
- when an explicit deactivation of the null activity context is performed by the SBB component itself.

Therefore, in case of single session services, i.e. in case of services requiring a single protocol session, the service instance and the null activity context are preferably removed by the reception platform upon reception of a final event by the activity context.

On the other hand, in case of multi-session services, i.e. in case of services wherein multiple sessions based on a same protocol or on different protocols have to be managed, service flows are preferably provided at the session layer, allowing to explicitly close each session. For this purpose, according to the present invention, the following steps are preferably implemented:
- while developing an SBB component, adding an EndActivity which, upon reception of a particular event, or upon expiration of a timer, generates a final event on the null activity context; or
- explicitly deactivating the SBB component by means of action handlers performed by the SBB component itself. In fact, according to the present invention, an SBB component allows defining initial events and also performs deactivation actions, thus allowing to explicitly invoke such deactivation actions while developing the service.

In the following, some examples are shown of event routing performed by the event router ER, according to embodiments of the present invention.

Figures 5A, 5B:
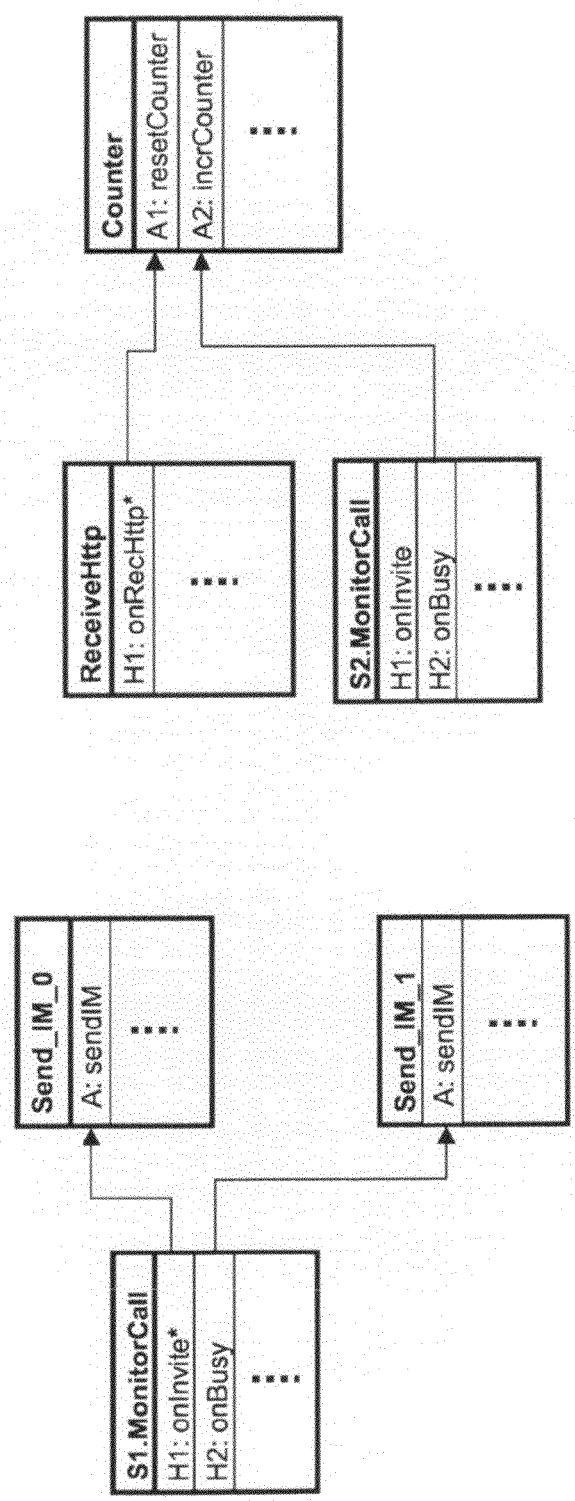
FIGS. 5a and 5b schematically show a first and a second exemplary services, which are implemented according to an embodiment of the present invention.

It is assumed that an application server is adapted to provide a first service S1 and a second service S2, whose SBB entity trees are shown in FIGS. 5a and 5b, respectively. Annex 1 is a service flow descriptor, in a simplified form, of services S1 and S2. The parts in bold are those used for computing the convergence name.

It is assumed that the second service S2 has a service instance s2. The consequent convergence names are reported in Table 1.

TABLE 1

| Cn | SBB name |
|---|---|
| Alias1;;; | s2.ReceiveHttp |
| sip:22222@telecomitalia.it;;; | s2.MonitorCall |

The resource adaptor of the SIP protocol receives a SIP INVITE message sent from a first user identified e.g. by the SIP address 11111@telecomitalia.it to a second user identified e.g. by the SIP address 22222@telecomitalia.it. The service will be performed as follows:
- the resource adaptor of the SIP protocol receives the SIP INVITE message and it inserts it in an event, whose event variable Address will assume a value equal to the SIP address 11111@telecomitalia.it of the first user;
- the resource adaptor of the SIP protocol forwards such an event to the platform event queue, and it associates to it a key based on the SIP header "call-Id" (identifier of the call). The platform will then generate an activity context and will associate it to this key;
- the platform issues an instance of the activity context for a SIP call;
- the Event Processor (a module of the platform responsible of processing events) recognizes the SIP INVITE message as initial event for the service S1, which is then invoked, as there is no instance of the SBB component S1.MonitorCall (which is the SBB root component of the service S1) active on the convergence name computed as a function of information of initial-event-select associated to the SBB root component of the first service S1;
- the SBB component S1.MonitorCall is attached to the activity context;
- upon creation of an instance s1, the consequent convergence names are reported in Table 2.

TABLE 2

| Cn | SBB name |
|---|---|
| alias1;;; | s2.ReceiveHttp |
| sip:22222@telecomitalia.it;;; | s2.MonitorCall |
| sip:11111@telecomitalia.it;;; | s1.MonitorCall |

Figures 6A, 6B:
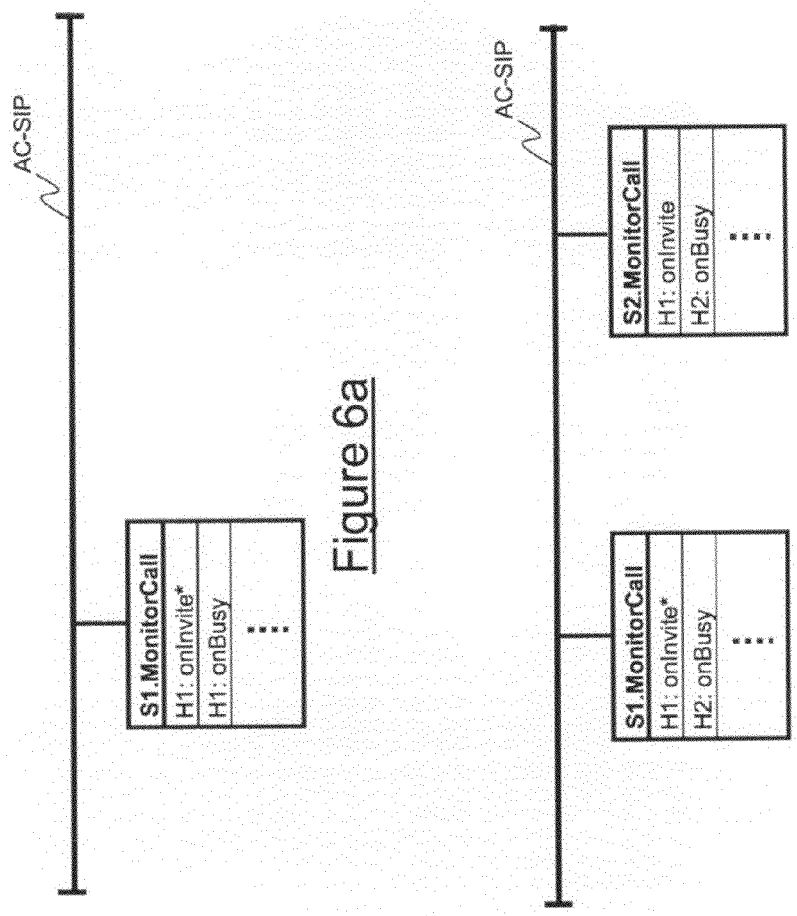
FIGS. 6a and 6b schematically show two steps for attaching to the activity context of a SIP call SBB components belonging to the first and to the second exemplary services shown in FIGS. 5a and 5b, respectively.

FIG. 6a shows the attach to the activity context of the new SIP session upon reception of the event comprising the SIP INVITE message.

It is now assumed that the second user is already engaged in another call. The sequence of steps of the service execution is the following:
- the resource adaptor of the SIP protocol receives a SIP BUSY message, and it inserts it in an event, whose event variable Address is the Request-URI of the SIP BUSY message (the Request-URI is a Uniform Resource Identifier and identifies the resource upon which to apply the request);

the resource adaptor of the SIP protocol forwards such an event to the SLEE event queue, and it associates to it the identifier of the first user the platform, based on the identifier of the first user, retrieves the activity context corresponding to the call;

the Event Processor does not perform any service instance. Nevertheless, it attaches the SBB component S2.MonitorCall to the activity context, since the computed convergence name corresponds to the convergence name the SBB component is interested to;

the Event Processor performs an instance of both SBB components, i.e. it forwards them the event according to a predetermined order based on priority values associate to each SBB component, as shown in FIG. 6b.

Therefore, the method for implementing a SLEE according to the present invention has a number of advantages in comparison with known methods.

First of all, as already mentioned, according to the present invention, thanks to the definition of a standard interface for all the SBB components, flexibility, modularity and possibility of reusing SBB components while developing a new service application are enhanced. Indeed, different services may be developed by using a same set of SBB components, and by simply developing a service flow descriptor configuring their standard interface, i.e. defining relations between them.

Moreover, according to particularly preferred embodiment of the invention, the definition of a standard interface for SBB components advantageously allows the implementation of initial events filtering criteria for all the SBB components, thus allowing to further enhance flexibility and possibility of reusing SBB components.

This advantageously allows to minimize duration, cost and effort for deploying new services in a communication network.

Further, the present invention advantageously allows to define, in a user profile, a dedicated profile parameter which allows preventing the service to be activated.

Lastly, the method of the invention is particularly advantageous for multi-protocol services, since a single user may be identified by a single user profile, whose definition is protocol-independent, so that there is no need of defining a separate user profile for each protocol involved into the service.

The method of the invention can be profitably implemented also as a computer program which is adapted to be run on a computer. Further, said computer program performing the method according to the invention could be stored on a computer readable medium.

Further, although the method of the invention has been described in detail by referring to an application server, the method of the invention could be optionally performed by any other network apparatus, including a user terminal. Therefore, the service logic execution environment SLEE according to the present invention could also be installed on a user terminal or on any other network apparatus.

---

Annex 1

S1 Flow Descriptor: MonitorCall + Send_IM_1 + Send_IM_0
```
<?xml version="1.0" encoding="UTF-8"?>
<xslee:slee-service-descriptor xmlns:xslee="urn:tilab:params:xml:ns:slee">
    <service-name>Service1</service-name>
    <service-version>1.0.0</service-version>
    <description>Service1 service</description>
    <root-sbb>MonitorCall_0</root-sbb>
    <default-priority>10</default-priority>
    <must-be-clustered>false</must-be-clustered>
    <sbb-list>
        <sbb>
            <sbb-name>MonitorCall_0</sbb-name>
            <default-priority>10</default-priority>
            <sbb-class>com.tilab.starslee.sbb.starsip.call.MonitorCallSbb</sbb-class>
            <sbb-type>MonitorCall.xml</sbb-type>
            <events>
                <event event-direction="Receive" initial-event="true">
                    <event-name>eventTypeInitial</event-name>
                    <event-type>
                        com.tilab.starslee.resources.starsip.StaraipEvent.EVENT_TYPE_INITIAL
                    </event-type>
                    <event-handler>onCallInitRecordRoute</event-handler>
                    <event-handler>onCallInit</event-handler>
                    <initial-event-select variable="ActivityContext" />
                </event>
                <event event-direction="Receive">
                    <event-name>eventTypeBusy</event-name>
                    <event-type>com.tilab.starslee.resources.starsip.StarsipEvent.EVENT_TYPE_BUSY
                    </event-type>
                    <event-handler>onCalleeBusy</event-handler>
                </event>
                ...
            </events>
        </sbb>
        <sbb>
            <sbb-name>SendIM_0</sbb-name>
            <default-priority>10</default-priority>
            <sbb-class>com.tilab.starslee.sbb.starsip.im.SendIMSbb</sbb-class>
            <sbb-type>SendIM.xml</sbb-type>
```

Annex 1

```xml
            <events>
                <event event-direction="Receive">
                    ...
                </event>
            </events>
            <properties>
                ...
            </properties>
        </sbb>
        <sbb>
            <sbb-name>SendIM_1</sbb-name>
            <default-priority>10</default-priority>
            <sbb-class>com.tilab.starslee.sbb.starsip.im.SendIMSbb</sbb-class>
            <sbb-type>SendIM.xml</sbb-type>
            <events>
                <event event-direction="Receive">
                    ...
                </event>
            </events>
            <properties>
                ...
                </property>
            </properties>
        </sbb>
    </sbb-list>
</xslee:slee-service-descriptor>
S2 Flow Descriptor: ReceiveHTTP + MonitorCall + Counter
<?xml version="1.0" encoding="UTF-8"?>
<xslee:slee-service-descriptor xmlns:xslee="urn:tilab:params:xml:ns:slee">
    <service-name>Service2</service-name>
    <service-version>1.0.0</service-version>
    <description>Service2.ssd service</description>
    <root-sbb>ReceiveHttp_0</root-sbb>
    <default-priority>10</default-priority>
    <must-be-clustered>true</must-be-clustered>
    <sbb-list>
        <sbb>
            <sbb-name>ReceiveHttp_0</sbb-name>
            <default-priority>10</default-priority>
            <sbb-class>com.tilab.starslee.sbb.http.ReceiveHttp</sbb-class>
            <sbb-type>ReceiveHttp.xml</sbb-type>
            <events>
                <event event-direction="Receive" initial-event="true">
                    <event-name>httpRequest</event-name>
                    <event-type>com.tilab.starslee.resources.http.HttpEvent.HTTP_REQUEST
                    </event-type>
                    <event-handler>onHttpRequest</event-handler>
                    <initial-event-select variable="Address" />
                </event>
                <event event-direction="Fire">
                    ...
                </event>
            </events>
            <properties>
                <property>
                    ...
                </property>
            </properties>
        </sbb>
        <sbb>
            <sbb-name>MonitorCall_0</sbb-name>
            <default-priority>10</default-priority>
            <sbb-class>com.tilab.starslee.sbb.starsip.call.MonitorCallSbb</sbb-class>
            <sbb-type>MonitorCall.xml</sbb-type>
            <events>
                <event event-direction="Receive" initial-event="true">
                    <event-name>eventTypeBusy</event-name>
                    <event-type>com.tilab.starslee.resources.starsip.StarsipEvent.EVENT_TYPE_BUSY
                    </event-type>
                    <event-handler>onCalleeBusy</event-handler>
                    <initial-event-select variable="ActivityContext" />
                    <initial-event-select variable="Address" value="22222@telecomitalia.it" />
                </event>
                ...
                </event>
            </events>
        </sbb>
        <sbb>
```

-continued

Annex 1

```
        <sbb-name>Counter_0</sbb-name>
        <default-priority>10</default-priority>
        <sbb-class>com.tilab.starslee.sbb.nonfunc.CounterSbb</sbb-class>
        <sbb-type>Counter.xml</sbb-type>
        <events>
            ...
        </events>
        <properties>
            ...
        </properties>
    </sbb>
  </sbb-list>
</xslee:slee-service-descriptor>
```

The invention claimed is:

1. A server of a communication network for providing a service to a plurality of users, said server comprising a service logic execution environment, said service logic execution environment comprising an event router and a service application, said service application comprising at least a first component and a second component, wherein said first component is provided with an event handler, said event handler being configured to receive an event and to send a trigger event to said event router, and said second component is provided with an action handler, said action handler being configured to receive said trigger event from said event router and, upon reception of said trigger event, to take a consequent action, wherein said service logic execution environment further comprises a service flow descriptor which comprises a relation between said event handler and said action handler, and wherein said event router is configured to receive said trigger event from said first component and to forward said trigger event to said second component according to said relation.

2. The server according to claim 1, wherein said first component comprises an output parameter, wherein said second component comprises an input parameter, wherein said service flow descriptor comprises a further relation for computing said input parameter as a function of said output parameter, and wherein said service logic execution environment computes said input parameter as a function of said output parameter according to said further relation.

3. The server according to claim 1, wherein at least one of said first component and said second component comprises an event handler which is configured to receive an initial event.

4. The server according to claim 3, wherein at least one of said first component and said second component is configured to be instantiated by said service logic execution environment through said service flow descriptor.

5. The server according to claim 3, wherein said service flow descriptor comprises predetermined filtering criteria associated with at least one of said first component and said second component for filtering said initial event.

6. The server according to claim 5, wherein said event router computes a convergence name corresponding to said initial event for at least one of said first component and said second component, said convergence name being computed according to said filtering criteria.

7. The server according to claim 6, wherein said initial event is associated with at least one event variable and wherein said convergence name is computed upon reception of said initial event as a function of said at least one event variable.

8. The server according to claim 6, wherein said service flow descriptor comprises at least one event variable and said convergence name is computed, upon creation of said first component or of said second component as a function of said at least one event variable.

9. A method for providing a service to a plurality of users in a communication network in a service logic execution environment which comprises an event router and a service application, wherein said service application comprises at least a first component and a second component, comprising the steps of:
    providing said first component with an event handler and said second component with an action handler;
    providing said service logic execution environment with a service flow descriptor comprising a relation between said event handler and said action handler,
    at said event handler of said first component, receiving an event and sending a trigger event to said event router;
    at said event router, receiving said trigger event from said first component;
    at said event router, forwarding said trigger event to said second component according to said relation; and
    at said action handler of said second component, receiving said trigger event from said event router and, upon reception of said trigger event, taking a consequent action.

10. The method according to claim 9, wherein said first component comprises an output parameter and said second component comprises an input parameter, further comprising the steps of:
    providing said service flow descriptor with a further relation for computing said input parameter as a function of said output parameter; and
    computing said input parameter as a function of said output parameter according to said further relation.

11. The method according to claim 9, wherein at least one of said first component and said second component comprises an event handler, further comprising the step of receiving an initial event at said event handler.

12. The method according to claim 11, further comprising the step of instantiating at least one of said first component and said second component by said service logic execution environment.

13. The method according to claim 11, further comprising the step of defining predetermined filtering criteria for receiving said initial event.

14. The method according to claim 13, further comprising the step of defining said filtering criteria by computing a convergence name corresponding to said initial event for at least one of said first component and second component.

15. The method according to claim 14, wherein said initial event is associated with at least one event variable and wherein said convergence name is computed, upon reception of said initial event, as a function of said at least one event variable.

16. The method according to claim 14, wherein said service flow descriptor comprises at least one event variable and said convergence name is computed, upon creation of said first component or of said second component, as a function of said at least one event variable.

17. A non-transitory computer readable medium having a computer program recorded thereon, said non-transitory computer readable medium comprising computer program code means configured to perform all the steps of claim 9, when said computer program is run on a computer.

18. A communication network comprising a server according to claim 1, for providing a service to a plurality of users.

19. A service logic execution environment stored on a non-transitory computer readable medium, the service logic execution environment comprising an event router and a service application, said service application comprising at least a first component and a second component, wherein said first component is provided with an event handler, said event handler being configured to receive an event and to send a trigger event to said event router, and said second component is provided with an action handler, said action handler being configured to receive said trigger event from said event router and, upon reception of said trigger event, to take a consequent action, wherein said service logic execution environment further comprises a service flow descriptor which comprises a relation between said event handler and said action handler, and wherein said event router is configured to receive said trigger event from said first component and to forward said trigger event to said second component according to said relation.

20. The service logic execution environment according to claim 19, wherein said first component comprises an output parameter, wherein said second component comprises an input parameter, wherein said service flow descriptor comprises a further relation for computing said input parameter as a function of said output parameter, and wherein said service logic execution environment computes said input parameter as a function of said output parameter according to said further relation.

21. The service logic execution environment according to claim 19, wherein at least one of said first component and said second component comprises an event handler which is configured to receive an initial event.

22. The service logic execution environment according to claim 21, wherein at least one of said first component and said second component is configured to be instantiated by said service logic execution environment through said service flow descriptor.

23. The service logic execution environment according to claim 21, wherein said service flow descriptor comprises predetermined filtering criteria associated with at least one of said first component and said second component for filtering said initial event.

24. The service logic execution environment according to claim 23, wherein said event router computes a convergence name corresponding to said initial event for at least one of said first component and said second component, said convergence name being computed according to said filtering criteria.

25. The service logic execution environment according to claim 24, wherein said initial event is associated with at least one event variable and wherein said convergence name is computed, upon reception of said initial event, as a function of said at least one event variable.

26. The service logic execution environment according to claim 24, wherein said service flow descriptor comprises at least one event variable and said convergence name is computed, upon creation of said first component or of said second component, as a function of said at least one event variable.

* * * * *